United States Patent [19]

Thomson

[11] Patent Number: 5,191,412
[45] Date of Patent: Mar. 2, 1993

[54] INSPECTION DEVICE FOR AIRCRAFT ENGINE

[75] Inventor: Richard C. Thomson, Edinburgh, Scotland

[73] Assignee: GEC Ferranti Defence Systems Limited, Stanmore, England

[21] Appl. No.: 782,307

[22] Filed: Oct. 24, 1991

[30] Foreign Application Priority Data

Oct. 24, 1990 [GB] United Kingdom ............... 9023089

[51] Int. Cl.$^5$ ...................... H04N 7/18; B64D 47/08
[52] U.S. Cl. .............................. 358/93; 250/214 VT; 358/106; 358/108
[58] Field of Search .................. 358/93, 108, 106; 250/213 VT

[56] References Cited

FOREIGN PATENT DOCUMENTS

| 467556 | 6/1937 | United Kingdom .................. 358/93 |
| 1009453 | 11/1965 | United Kingdom . |
| 1014185 | 12/1965 | United Kingdom . |
| 1569415 | 6/1980 | United Kingdom .................. 358/93 |

OTHER PUBLICATIONS

The Photographic Journal, vol. 92B, Jan. 17, 1952, London, pp. 149-157, R. A. Chippendale, "Image Converter Techniques Applied to High Speed Photography, ".

Applied Optics, vol. 18, No. 6, Mar. 15, 1979, N.Y. US, pp. 745-746, Lieber et al., "Picosecond Framing Camera Using A Passive Microchannel Plate".

*Primary Examiner*—Howard W. Britton
*Attorney, Agent, or Firm*—Jacobson, Price, Holman & Stern

[57] ABSTRACT

To permit in-flight inspection of an aircraft engine, an imager views the front of the engine, and includes an image intensifier which is gated on and off at the engine speed. Small variations about the engine speed may be used to sweep all the blades into the field of view of an imager which does not view the whole of the front of the engine.

11 Claims, 1 Drawing Sheet

INSPECTION DEVICE FOR AIRCRAFT ENGINE

This invention relates to inspection devices for aircraft engines.

The view from a cockpit of an aircraft is restricted and it is not usually possible to view the aircraft engines from it. The engines can thus only be inspected when the aircraft has landed. However, there are occasions, such as when a bird may have been sucked into the engine, where it would be useful to inspect the aircraft engine during flight, in order to ascertain if a blade had been deformed or broken.

The invention provides an imager for an aircraft engine including an image intensifier, and means for gating the image intensifier to enable rotating engine parts to be viewed as if stationary or rotating slowly.

The invention enables in-flight inspection of engines to take place.

The image intensifier may be gated by biasing the accelerating voltage for a microchannel plate on and off at around the engine speed. The imager may be mounted near the door, of an aircraft, or other position to view the engine.

An imager for an aircraft engine constructed in accordance with the invention will now be described, by way of example, with reference to the accompanying drawings, in which.

Figure 1:
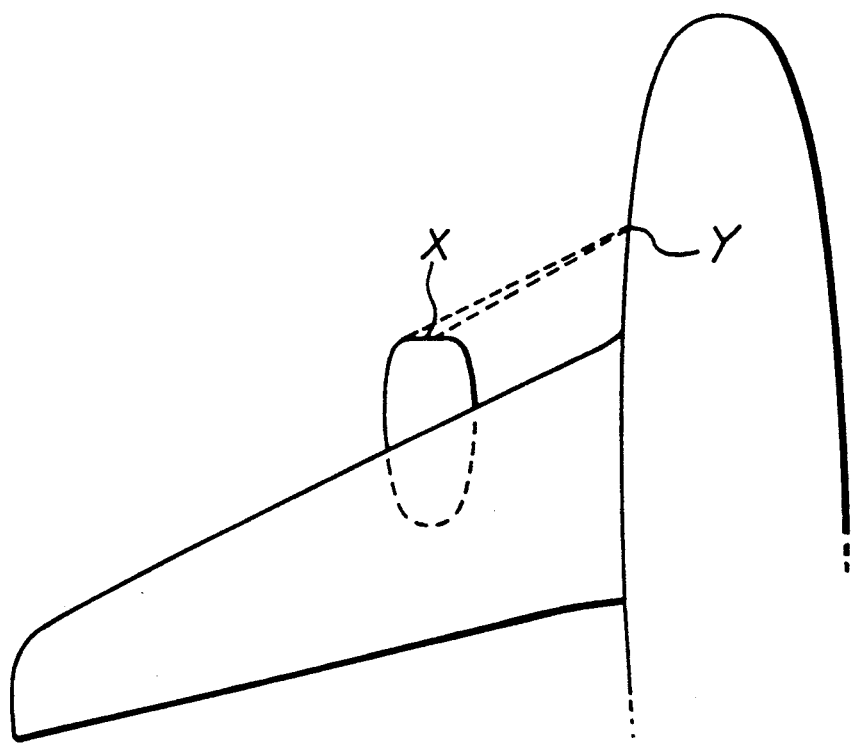
FIG. 1 is a plan view of a part of an aircraft fitted with the imager.
Figure 2:
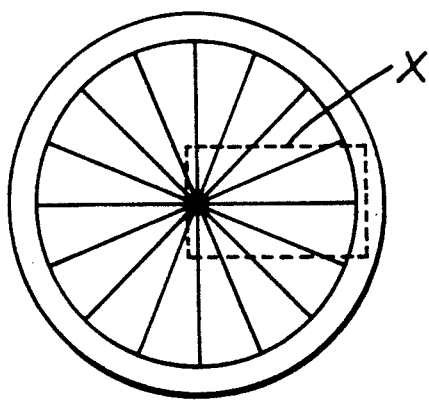
FIG. 2 illustrates the field of view of the imager.

The imager I (FIG. 1) is mounted in the region of a cabin door Y of the aircraft, and has a narrow field of view covering an area X on one side of the front of a turbo-fan engine mounted under an adjacent wing. An identical imager is mounted on the other side of the aircraft to view the corresponding area of the other engine(s).

Figure 3:
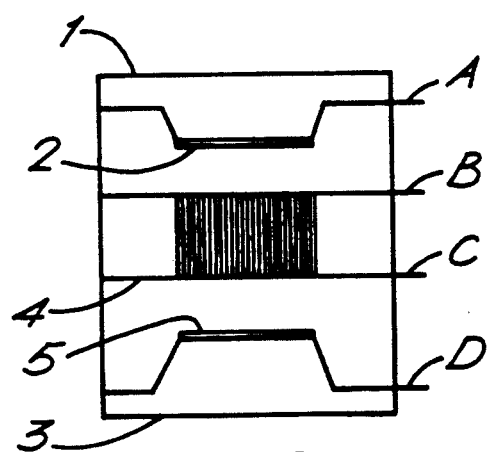
FIG. 3 is a schematic view of the image intensifier.

A lens system (not shown) forms an image of the area X onto a glass faceplate 1 of the image intensifier II (FIG. 3). The glass faceplate 1 may consist of a multiplicity of optical fibres arranged axially so that the region X is imaged directly onto a photocathode 2. The photocathode 2 is connected to a terminal A and emits electrons in proportion to the intensity of the image on the faceplate 1. An evacuated region between the faceplate 1 and a glass substrate 3 contains a microchannel plate 4, containing in its central region thousands of minute axial channels. The electron image from the photocathode 2 is amplified by the microchannel plate 4, which has an accelerating potential between terminals B and C connected across it.

Electrons entering each channel are accelerated along the channels where they strike the walls, releasing further electrons which in turn strike the walls and release yet more electrons, and so on. The amplified electron image strikes a phosphor layer 5 on the glass substrate 3, connected to a terminal D, where an intensified version of the image focused onto faceplate 1 is formed. An accelerating potential of several e.g. 5 k.v. is applied between terminals C and D, and a potential of around 1 k.v. is applied between terminals B and C. A fibre optic bundle (not shown but which may extend to phosphor layer 5) picks up the intensified image and couples it to a CCD imager. The CCD device is operated in a manner similar to those used in conventional television cameras. The TV picture may then be, displayed or recorded as wished.

In accordance with the invention, the accelerating voltage is gated at the engine speed by a gating circuit 6, each on period being for a few micro-seconds, which is a sufficient time for the intensified image to be formed. The result is that the fan blades appear to be stationary on the pilot's screen and can be viewed in detail in a manner similar to a stroboscope.

Thus, if a bird was sucked into the engine, the pilot could inspect the fan carefully to ascertain if any blade was deformed or broken.

In order to view the entire set of fan blades, means may be provided in the gating circuit 6 for varying the gating speed slightly, so that the blades appear to move slowly, and so that each blade in turn crosses the pilot's screen. Naturally, any blade can be made to appear stationary by further adjustment of the gating circuit 6.

It would be possible to study parts of the engine inside the fan. Thus, a compressor is located behind the fan, and is of about one third the diameter of the fan. The gating speed of the gating circuit 6 may be set to the speed of this compressor blade, and the image of the blades may then be viewed.

The gating time is chosen as a balance between a more intense image due to longer exposure and blurring of the image due to longer exposure. Thus, for example, for a sensor resolution of 400 TV lines with a 4:3 aspect ratio, a typical blade of radius 42 inches and maximum width of 11 inches would fill approximately ⅓rd of picture height i.e. 140 pixels. For blur to be less than 1 pixel the exposure must be less than the time for the blade to travel 1/140th of its width i.e. 78 thousandths of an inch. At a take-off speed of 4,000 rpm, the blade edge is moving at 17,600 inches/sec. and hence travels 78 thousandths of an inch in 4.43 .sec. The intensifier II would thus be on for 4.43 .sec. at the engine speed of 66.6 times a second, giving a total exposure of 4.43×6.66 .sec. per second. To obtain a normal exposure requires a gain of the reciprocal of that value i.e. approximately 3,300. A microchannel plate intensifier is capable of a gain of $10^5$, and is hence adequate. The gating may be done using a transistor in the gating circuit to forward or reverse bias the rear plate of microchannel plate 4.

Variations may be made without departing from the scope of the invention. Thus, instead of imaging only one half of the front of the engine, the imager I may be able to pan over the surface of the engine. Further, the imager I could be used for checking the speed of rotation of the engine, and would also of course be able to view the engine to confirm the presence or absence of a fire or any other failure condition. The invention may also be used for the inspection of any rotating part, not necessarily part of an aircraft engine.

I claim:

1. An imager which is adapted to be mounted on an aircraft for viewing the front of an aircraft engine in flight, which comprises:
    means for forming an image of at least a portion of the front of the aircraft engine;
    means for intensifying the formed image; and
    means for gating the image intensifying means to enable rotating engine parts to be viewed through the front of the aircraft engine as if stationary or rotating slowly.

2. An imager as claimed in claim 1, wherein the aircraft engine has a plurality of blades and which further comprises means for varying the gating speed of the image intensifying means to enable all of the blades of the aircraft engine to sweep through the field of view of the imager.

3. An aircraft including in combination therewith, an imager as claimed in claim 1.

4. An imager as claimed in claim 1, in which the gating means is arranged to switch an accelerating potential for a microchannel plate of the image intensifying means on and off.

5. An imager as claimed in claim 4, wherein the image intensifying means further comprises:
a faceplate upon which an image of at least a portion of the front of the aircraft engine is initially formed; and
photocathode means for receiving the image from the faceplate and producing the image on the microchannel plate.

6. An imager as claimed in claim 5, wherein the faceplate comprises a plurality of optical fibers arranged axially so that the image on the faceplate is imaged directly onto the photocathode means.

7. An imager as claimed in claim 5, wherein the microchannel plate amplifies the image received from the photocathode means.

8. An imager as claimed in claim 7, which further comprises substrate means having an imaging layer for receiving the image from the microchannel plate.

9. An imager as claimed in claim 8, wherein the photocathode means and the microchannel plate are disposed in an evacuated region between the faceplate and the substrate means.

10. An imager as claimed in claim 9, wherein the faceplate comprises a plurality of optical fibers arranged axially so that the image on the faceplate is imaged directly onto the photocathode means.

11. An aircraft including in combination therewith, an imager as recited in claim 10.

* * * * *